United States Patent [19]

Schreyer

[11] 4,128,481

[45] Dec. 5, 1978

[54] CURVE FOLLOWING DEVICE

[75] Inventor: Heinz B. Schreyer, Puchheim, Fed. Rep. of Germany

[73] Assignee: Erwin Sick GmbH Optik-Elektronik, Waldkirch, Fed. Rep. of Germany

[21] Appl. No.: 744,810

[22] Filed: Nov. 24, 1976

Related U.S. Application Data

[63] Continuation-in-part of Ser. No. 650,612, Jan. 20, 1976, abandoned.

[30] Foreign Application Priority Data

Feb. 7, 1975 [DE] Fed. Rep. of Germany ........ 2505296

[51] Int. Cl.² .................................................. G05B 1/00
[52] U.S. Cl. ...................................... 250/202; 318/577
[58] Field of Search ................... 250/202, 237; 318/577

[56] References Cited

U.S. PATENT DOCUMENTS

| | | | |
|---|---|---|---|
| 3,286,142 | 11/1966 | Redman | 250/202 |
| 3,478,792 | 11/1969 | Oram | 250/202 |
| 3,496,437 | 2/1970 | Layden | 250/202 |
| 3,673,412 | 6/1972 | Olson | 250/202 |
| 3,739,179 | 6/1973 | Krekow | 250/202 |
| 3,790,788 | 2/1974 | Lister | 250/202 |
| 3,914,595 | 10/1975 | Tinet | 250/202 |

*Primary Examiner*—Lawrence J. Dahl

[57] ABSTRACT

A curve-following device having an optical sensing head which senses a guide zone containing the guide line to be followed and having at least a substantial transverse component, and which is movable along the guide zone at a substantially slower speed than the sensing rate and is connected to a control instrument which forms, from the signals delivered by the sensing head, control signals for the movement of the sensing head along the guide line. Marks associated with the guide line and detectable by the sensing head are detected for tripping further control commmands. At least one separate code zone which is sensed separately from the guide zone is provided at the side of the guide zone.

11 Claims, 8 Drawing Figures

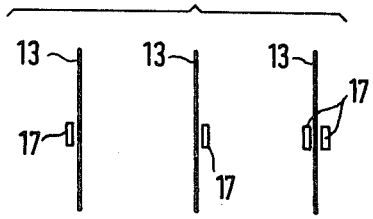
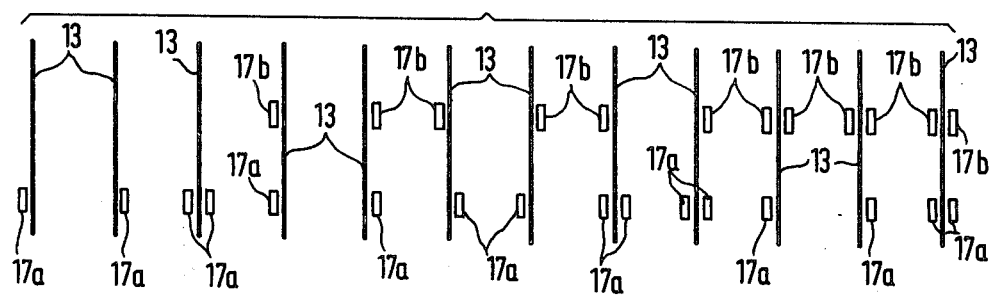
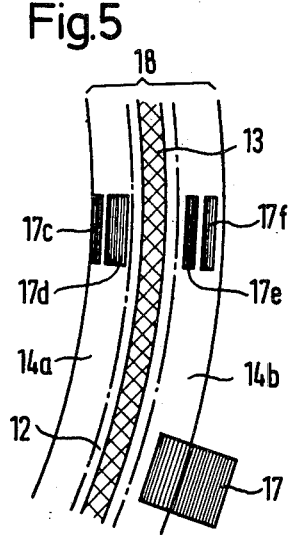
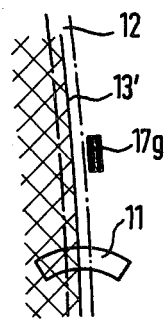
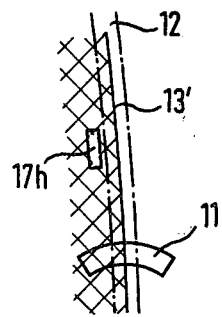

CURVE FOLLOWING DEVICE

This application is a continuation-in-part application of Ser. No. 650,612, filed Jan. 20, 1976, now abandoned.

The invention relates to a curve-following device having an optical sensing head which senses a guide zone containing the guide line to be followed and having at least a substantial transverse component, and which is movable along the guide line at a substantially slower speed than the sensing rate and is connected to a control instrument which forms, from the signals delivered by the sensing head, control signals for the movement of the sensing head along the guide line, while marks associated with the guide line and detectable by the sensing head are detected in order to trip further control commands, according to Assignee's copending U.S. patent application Ser. No. 502,026, filed Mar. 25, 1975 now U.S. Pat. No. 3,995,154, issued Nov. 30, 1976.

Devices of this type are used, for example, for sensing curved paths or tracks previously drawn on templates and for steering a tool along them. For this purpose the sensing head senses, for instance in a circular manner, a guide line of constant width (German patent application No. 2,204,118). The centre of the circular path is then located on one edge of the line, i.e., the impulses generated by travelling across the edge of the line are utilized for the control. With such a mode of sensing, impulses occur e.g., at 0° and 180°, which are evaluated in a suitable electronic evaluation circuit in order, in the event of deviations from the desired disposition of the circular sensing line with reference to the guide line to be followed, to control co-ordinate motors on the sensing head or on the steered tool so that any incorrect alignment detected is corrected. The sensing curve of the sensing head need not necessarily be circular. It is only essential that a substantial sensing component transverse to the guide line to be followed is present in the sensing. The line is preferably sensed exactly in the transverse direction, which is likewise fulfilled by the known circular mode of sensing.

A certain guide zone is generally available at the sides of the guide line, and is likewise included in the sensing.

The underlying aim of the invention in the U.S. Patent referred to above is that control commands for the deflecting of the sensing head at a branching point are arranged in front of a path section which is travelled more than once, while it is desired to ensure that the necessary control commands are given at a suitable point with high precision and without the risk of errors. In order to achieve this aim it is provided according to the above identified patent that an integrator is provided fed with a voltage proportional to the speed of the sensing head, which from the appearance of a mark of the line in the region of the sensing head delivers a signal proportional to the distance travelled, as a function of which the further control commands are given.

The present invention deals with the solution of another problem which arises due to the fact that variations in the guide line frequently lead to failures during operation of the device. In this respect it must be borne in mind that the preparation and evaluation of the patterns for the curve control system are carried out in workshops where certain inaccuracies in the drawing of the guide line, or also dirt on a pattern, cannot be entirely excluded.

It is therefore the object of the present invention to produce a curve-following device of the type hereinbefore defined, in which no failures occur in the event of specific variations of the guide line. Even when certain variations of the guide line occur, therefore, accurate sensing should still be obtained, as is required principally for milling or digitalising from lines.

In order to fulfil this object it is proposed according to the invention that at the side of the guide zone there is provided at least one separate code zone which is sensed separately from the guide zone. Preferably, code zones are provided on both sides of the guide zone. According to the invention therefore, the sensing track, which extends substantially transversely to the guide line, is subdivided into a plurality of zones. This considerably improves freedom from faults.

The separate sensing of the guide zone and of the code zone is advantageously achieved by appropriately arranged shutters. This means that the code zones are shuttered out during the sensing of the guide zone and the guide zone is shuttered out during the sensing of the code zones. Any mutual influencing of the control signals and control commands obtained from these two sensings is thus effectively eliminated.

A particularly advantageous embodiment is characterized by the fact that the guide zone and the code zones are sensed optically and consecutively by the same sensing head and the separation of the sensings is effected by electronic shutters or gates in the control instrument. The sensing head can thus be equipped with a single sensing device, because the electronic shutting-out can be realised in a very simple manner with the circuit elements currently obtainable.

The construction is preferably such that the marks in the code zones are longer than the width of the guide lines and in the control instrument, during the sensing of the code zones, the length of each mark detected is determined and a control command is tripped only if the mark detected exceeds a prescribed length. This embodiment is particularly important if the guide line may possess branchings. By virtue of the above stated length of the marks, the control instrument can thus distinguish between a branch line possessing a considerably shorter width, and a code mark.

Depending upon how many items of information are required to be accommodated at one specific point of the guide line, each mark may be constituted by a rectangular field, or by one or two rectangular fields arranged one behind the other. The marks may optionally be formed by a bar code.

It is particularly advantageous if the marks are constituted by detachable stickers, in which case the stickers may extend beyond the code regions laterally. In the case of this construction the code marks tripping the control commands can easily be affixed at any desired point and also removed again if necessary. The handling of the stickers is also facilitated by the lateral overhang.

The invention is further described by way of example hereinbelow with reference to the accompanying drawing wherein:

FIG. 3 shows a purely schematic plan similar to FIGS. 1 and 2 and is to illustrate the possibilities of accommodating items of information when using a second code;

FIG. 4 shows schematic plans similar to FIGS. 1 to 3 to illustrate the possibilities of accommodating items of information when using a second code;

FIG. 5 shows a plan similar to FIG. 2 to illustrate the arrangement of a further conceivable code;

FIGS. 6 and 7 show applications of the invention to a control system using a sensing edge.

Figure 1:
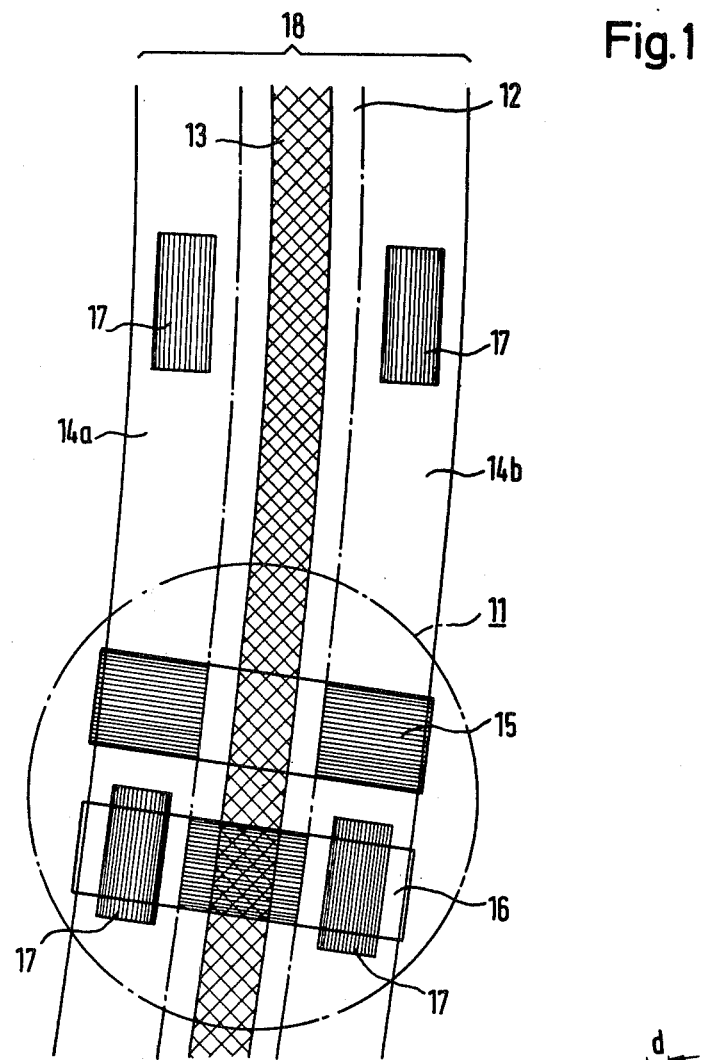
FIG. 1 shows a large scale plan of the sensing zone of a curve-following device according to the invention, in which the sensing head is also indicated schematically.

According to FIG. 1, the overall sensing region 18 of a sensing head 11, illustrated purely schematically, which is arranged at a distance above the sensing region 18 and is movable in a horizontal plane by co-ordinate motors, is subdivided into three zones 14a, 12 and 14b. The zone 12 is the known guide zone, within which the guide line 13 is arranged. The guide line 13 can assume the width of the guide zone 12 in the extreme case.

According to the invention, the lateral zones constitute code zones 14a, 14b in which code marks 17 are arranged, which preferably have the form of a rectangle elongated in the direction of the guide line 13.

The guide zone 12 and the code zones 14a, 14b, are sensed separately, which can be effected by shutters 15, 16 illustrated purely schematically in FIG. 1. The shutter 15 masks the code zones 14a, 14b and allows only the guide zone 12 to show. The shutter 16, conversely, masks the guide zone 12 and allows only the code zones 14a, 14b to show. However, no mechanical shutter 15, 16 have to be arranged in the sensing head. In this case, the shuttering-out can be performed electrically by the control system according to FIG. 8 which will be described further below.

Therefore, whereas the guide zone 12 is utilized in customary manner for steering the sensing head 11, the code zones 14a, 14b, are utilized for items of information which are important during the sensing of a guide line, for example information for laser or torch control, left-hand, right-hand information for forks or intersections, tool change, speed changer-over, and so forth.

In detail, therefore, the sensing proceeds by sweeping the guide zone 12 and the code zones 14 alternatively and consecutively, and the signals thereby obtained are also evaluated in different circuit stages of the control instrument. For this purpose the integrator forming the subject of the above-mentioned U.S. Pat. No. 3,995,154 may also be of advantage, if for example, a right-hand deflection signal is required to be given only a certain distance after a code mark 17.

Figure 2:
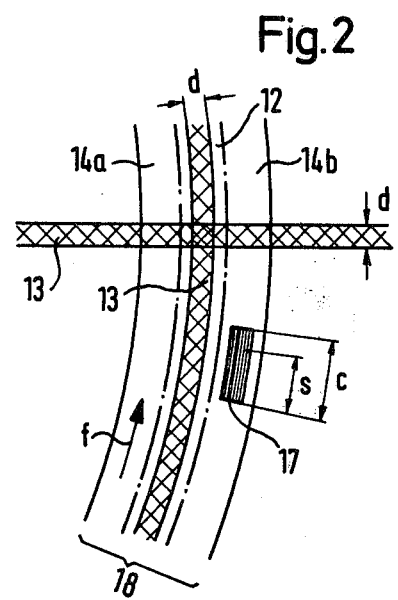
FIG. 2 shows a plan similar to FIG. 1 on a slightly smaller scale to illustrate the conditions at the point of intersection of two guide lines.

In order to differentiate code marks 17 reliably from intersecting guide lines, the code marks 17 are according to FIG. 1 made longer than the width of the guide lines 13. According to FIG. 2, the guide lines have a width d, whereas the length of code mark 17 is c. The electronic circuits in the control instruments are designed so that the mark 17 is recognized as a genuine code only above a measured minimum length s. Since d is smaller than s, no control command would be tripped by travelling over the intersecting guide line 13 in the direction of the arrow f.

Decisive importance attaches to the length of the code marks 17. During the sensing, the length of the mark is tested in the control instrument independently of the speed along the guide line 13, which is effected by integration of a signal proportional to the speed over the time in which the code mark 17 is detected. If V is the speed (which may also be variable) of the sensing head 11, and t is the duration of the impulse detection on the code track, then the code length is represented mathematically as follows:

$$s = \int_0^t V \cdot dt.$$

FIGS. 3 and 4 show different possibilities of accommodating items of information on both sides of the guide line 13.

According to FIG. 3 only one or two code marks 17 are employed beside the guide line 13 in each case. In this manner a total of three different items of information can be accommodated.

In the embodiment according to FIG. 4, up to two code marks 17a, 17b, are employed one behind the other on both sides of the guide line 13, which permits the accommodation of a total of twelve different items of information.

In the embodiment according to FIG. 5, a bar code is employed with bars 17c, d, e, f, which make possible the accommodation of very much more varied information for a single sensing. The above stipulated condition for the length of the code marks is valid for all embodiments.

FIG. 5 illustrates, at the bottom, a yet further possibility for the application of code marks 17, which involves a detachable sticker which extends laterally beyond the code zone 14b, in order to be easy to handle. The use of removably adhesive code marks 17 has the advantage that the latter can be arranged at any desired points along the guide line and can also be removed again if required.

FIGS. 6 and 7 illustrate the application of the concept of the invention in an embodiment which operates with a sensing edge instead of with a guide line. In this embodiment the invention is particularly advantageous because the principle of line narrowing described in the above-mentioned U.S. Pat. No. 3,995,154 is not applicable here.

The code marks may be arranged either on the one side of the sensing edge 13' (FIG. 6: 17g) or on the other side (FIG. 7: 17h), while adequate contract of the mark with respect to the surroundings must always be ensured.

Figure 8:
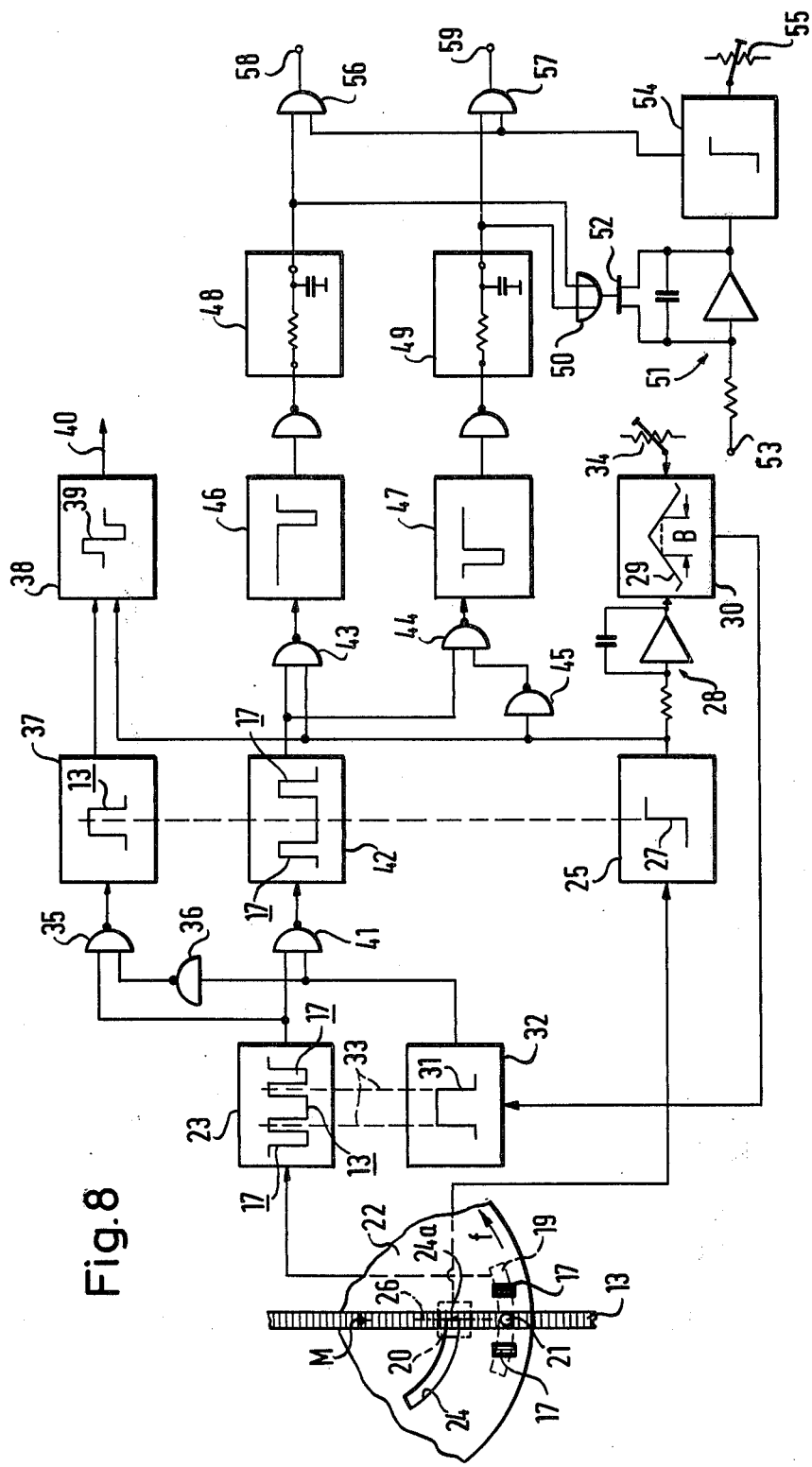
FIG. 8 diagrammatically illustrates the control system according to the present invention, including a perforated disc sensing a line and photo-electric receivers.

According to FIG. 8, a perforated disc 22 rotating about a center M and provided in sensing head 11 periodically senses the sensing region 18, with a hole 21 provided adjacent its circumference. A photo-electric receiver 19 is located behind the perforated disc in the area of the sensing region 18 and extending on both sides somewhat beyond this region, an impulse former 23 being connected to the receiver 19. Upon rotation of the perforated disc 22, in the direction of the arrow f the hole 21 senses consecutively the code mark 17 to the left of line 13, then line 13, and finally the code mark to the right of line 13. Consequently, in view of the connection to the photo-receiver 19, in the impulse former 23 impulses 17, 13 and 17 are formed, it being assumed that the code marks 17 and the line 13 are dark and the background light.

The perforated disc 22 is also provided with an arcuate slot 24 behind which there is arranged a further reference photo-receiver 20. On the side of the disc 22, opposite the reference photo-receiver 20, there is arranged a light source. Photo-receiver 20 is connected to a further impulse former 25, in which upon passage of the front edge 24a, a stepped signal diagrammatically illustrated in the impulse former 25, is produced. Assuming that the speed of rotation of the perforated disc 22 is constant, the measurement of location can be reduced to a measurement of time, i.e., deviations in position of the line in relation to the center line 26 of the photo-receiver 20 thus appear as time differentials of the line impulses 13 in relation to the reference step 27.

It is the object of the circuit to bring about the exact separation of code impulses 17 and line impulses 13. The reference impulse produced by the perforated disc 22, by the step 27 is transformed into a triangular voltage 29, via an integration stage 28. This triangular voltage is processed in a subsequent comparator 30, which supplies a separating impulse 31 which in turn will be processed further by a stage 32. Dash lines 33 illustrate the time relationship of the separating impulses 31 to the code impulses 17 and the linear impulse 13.

Via an adjusting potentiometer 34 a variable direct current can be supplied to the comparator 30, by means of which the width B of the separating impulse 31 can be adjusted. The output of impulse former 23 is passed on to the input of a NAND-gate 35, while the other input of NAND-gate 35 is supplied with a voltage corresponding to the reference impulse 31 from the stage 32 via a negation member 36. In view of this circuitry, in a further impulse stage 37 the line impulse 13 separated from the code impulses 17 appears. The output of stage 37, together with the output of stage 25, is connected to a mirror circuit 38 in which the line impulse 13 is mirrored about the reference stage 27 so that a signal 39 is produced which in the case of positional deviations of the line from the proper center position results in an analogous time deviation of the line impulse, i.e., either the positive or negative portion of the control signal 39 prevails. A servo motor is connected to the output 40 of circuit 38, the motor aiding the movement of the sensing head 11 in a direction towards the center line. The output of stages 23 and 32 are further connected to a NAND-gate 41, which separates the code impulses 17 from the line impulse 13, as shown in box 42. Via further NAND-gates 43 and 44 or a negation member 45, respectively, the code impulses 17 are separated depending on their position to the right or left of the guide line 13, as illustrated by boxes 46, 47. The reference signal for the code "right" (46) is direct, that for the code "left" (47) is inverted.

In order to obtain a separation of the code marks 17 from crossing lines, the code marks are longer than the width of the line. The separation is effected by means of the circuitry shown in FIG. 8 by connecting the line impulses 46, 47 necessary after negation via screen stages 48, 49 as a direct current to an OR-gate 50. The OR-gate 50 via a FET-switch 52 controls an integrator 51 to which a voltage is fed at 53 which is proportional to the advance of the head 11. A comparator 54 is connected at 55 to integrator 51 with an adjustable threshold.

The outputs of screen stages 48, 49 and the output of comparator 54 is connected to AND-gates 56 and 57, respectively, as shown.

As a consequence, code signals appear at the outlets 58, 59 only if the integrator 51 was connected via the elements 50, 52 for a time sufficient to surpass the threshold of the comparator 54. This time is adjusted by means of the potentiometer 55 such that the length of the code marks 17 is sufficient for surpassing the threshold, but not the width of a line crossing the guide line 13. Consequently, at outputs 58, 59 signals appear actually only when code marks 17 have been sensed. The signals appearing at 58, 59 maybe used in a manner known per se, for initiating desired control functions.

What is claimed is:

1. A curve-following device having an optical sensing head capable of sensing a guide zone containing a guide line having a substantial component transverse to its longitudinal direction and of sensing at least one separate code zone provided adjacent at least one side of said guide line and marks within said code zone, said curve-following device comprising optical scanning means within said head for periodically scanning said guide zone with a certain frequency and for generating signals, means for moving said head along said guide zone at a speed relatively slow in relation to said frequency of the scanning period of said scanning means, a control instrument connectable to said device and having means for receiving said signals generated by said optical scanning means and for distinguishing between marks arranged within said at least one code zone and said guide line, and means for generating first control signals for controlling said means for moving the sensing head along said guide line, means for tripping second control signals for controlling means other than said moving means, and including means for comparing the length of said marks with said transverse component of the guide line and means for preventing tripping said second control signals unless a mark detected in said code zone exceeds a predetermined length.

2. A device according to claim 1, wherein code zones are provided on both sides of the guide zone.

3. A device according to claim 1, comprising shutters for separately sensing the guide zone and the code zones.

4. A device according to claim 3, wherein said guide zone and said code zones are sensed optically and consecutively by said sensing head, and electronic shutters in said control instrument for separating the signals sensed by said head.

5. A device according to claim 1, wherein each of the marks to be sensed in the code zones is constituted by a rectangular field.

6. A device according to claim 2, wherein each of the marks to be sensed in the code zones is constituted by rectangular fields arranged one behind the other.

7. A device according to claim 1, wherein the marks to be sensed in the code zones are constituted by a bar code.

8. A device according to claim 1, wherein the marks to be sensed in the code zones are constituted by detachable stickers.

9. A device according to claim 9, wherein the stickers extend laterally beyond the code zones.

10. A device according to claim 1, wherein the guide zone includes a sensing edge.

11. A device according to claim 10, wherein the code marks are provided only on one side of the sensing edge.

* * * * *